Nov. 17, 1970  J. K. LEE  3,541,505
AUTOMOBILE ALARM SYSTEM

Filed March 7, 1968  3 Sheets-Sheet 1

INVENTOR.
JOSEPH K. LEE
BY
*Christie, Parker & Hale*
ATTORNEYS.

Nov. 17, 1970    J. K. LEE    3,541,505

AUTOMOBILE ALARM SYSTEM

Filed March 7, 1968    3 Sheets-Sheet 2

INVENTOR.
JOSEPH K. LEE
BY
Christie, Parker & Hale
ATTORNEYS.

Nov. 17, 1970 J. K. LEE 3,541,505
AUTOMOBILE ALARM SYSTEM
Filed March 7, 1968 3 Sheets-Sheet 3

INVENTOR.
JOSEPH K. LEE
B.
Christie, Parker & Hale
ATTORNEYS ically actuated when he opens the door
United States Patent Office 3,541,505
Patented Nov. 17, 1970

3,541,505
AUTOMOBILE ALARM SYSTEM
Joseph K. Lee, 10616 Bramblebush Ave.,
Whittier, Calif. 90604
Continuation-in-part of application Ser. No. 641,332,
May 25, 1967. This application Mar. 7, 1968, Ser.
No. 711,269
Int. Cl. B60r *25/00;* G08b *13/00*
U.S. Cl. 340—64
15 Claims

ABSTRACT OF THE DISCLOSURE

Automobile anti-burglary and anti-theft system having an audible warning device actuated by any one of a plurality of actuator switches in response to the opening of a door, the trunk lid, or the hood of the vehicle. A safety device responsive to the presence of a key in an ignition lock of the automobile prevents the setting of the alarm system as long as the key is in the ignition lock.

CROSS-REFERENCE TO RELATED APPLICATION

This application is a continuation-in-part of my prior filed, copending application Ser. No. 641,332, filed May 25, 1967.

BACKGROUND OF THE INVENTION

Field of the invention

This invention relates to systems for preventing theft of automobiles, and more particularly to a system which is set by locking a door of the automobile. Although this invention can be used on all types of automobiles, it is particularly well adapted for use on automobiles the doors of which can be locked without a key since it prevents the accidental locking of the doors without first removing the key from the ignition.

State of the prior art

Automobile thefts are now at such a level that a large number of alarm systems, designed to prevent such thefts, have appeared on the market and in the literature. Prior alarm systems function in accord with a variety of principles. One such an alarm system is shown in my copending patent application bearing Ser. No. 641,332, filed on May 25, 1967. That alarm system is set by locking a door of the automobile so that an alarm device becomes electrically connected with a storage battery in the vehicle upon the unauthorized opening of one of the vehicle doors.

There are presently available many automobiles which include a door lock mechanism which can be locked with or without the use of a key. With such mechanisms, it is possible to lock a door and set the alarm described in my copending application without removal of the key from the ignition lock of the vehicle. This locking capability is considered by many, including myself, to be undesirable since the owner of the automobile can lock the ignition key into the vehicle and can lock himself out. Only after considerable expense and time, usually with the help of an experienced locksmith, can the vehicle be unlocked. When the ignition key is locked into the vehicle, it usually is visible from outside the vehicle and serves as a passive invitation to persons of a mind of such turn to steal the vehicle merely by breaking a window, opening the vehicle, and driving away.

The prior art, independently of anti-theft alarm systems, discloses devices which prevent the accidental locking of automobile doors incorporating lock mechanisms of the type discussed above without having first removed the key from the ignition switch. One such device is disclosed in U.S. Pat. 2,802,357.

SUMMARY OF THE INVENTION

The present invention provides an automobile alarm system which is set by locking a door of the automobile and is activated by the unauthorized opening of a door after the alarm is set. The system includes apparatus for preventing the locking of the door, thereby to set the alarm, by a mechanical device which is independent of the door lock and which operates so long as a key is in an ignition switch of the automobile. Electrically actuated means for disabling the door lock mechanism are coupled with the ignition switch.

Preferably, a common key is used to operate both the door lock and the ignition switch, the latter including a locking cylinder disposed in a housing and a pair of normally open electric contacts on the housing. Radially movable means in the housing close the contact when the key is inserted in the lock cylinder. This activates a solenoid which engages a member of the door lock mechanism, thereby preventing the locking of the door by said mechanical device until the key is removed from the cylinder. An operator of the vehicle is required to remove the key from the ignition switch before the automobile can be locked and the alarm set. The advantage of setting the alarm simultaneously with the locking of the car, which prevents the inadvertent activation of the alarm system as, for example, if the alarm is set while the operator is in the automobile and activated when he opens the door to leave the automobile, is combined with the safety feature which prevents the locking of the car as long as the key remains in the ignition switch.

DESCRIPTION OF THE PREFERRED EMBODIMENTS

Figure 1:
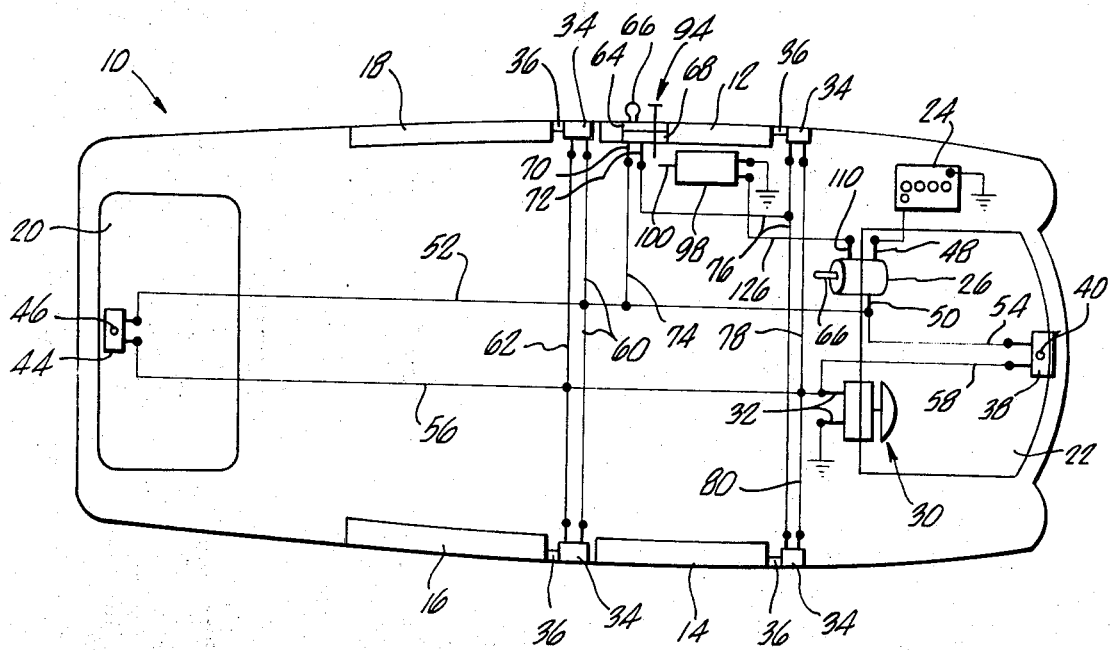
FIG. 1 is a schematic diagram of an alarm system and means for preventing the setting of the alarm system by locking of a door of an automobile while an ignition key is in the vehicle ignition switch.

Referring to FIG. 1, there is shown an automobile 10 having a front driver's door 12, a front passenger door 14, and a pair of rear passenger doors 16 and 18. The automobile includes a luggage compartment or trunk lid door 20 at its rear end and an engine compartment hood 22 at the front. The space beneath the hood includes an automobile engine (not shown) and a conventional battery 24. The interior of the passenger compartment includes an ignition switch and lock mechanism 26 connecting a plurality of electrical components (not shown) such as the vehicle's ignition system, a radio, a heater, and the like with the battery. The ignition switch can be placed in a plurality of operating positions such as an engine start position, an engine running position, an off position, a position connecting the electrical components with the battery without energizing the engine ignition system, and it may include a locking position. In one position, preferably the locking position, the ignition switch connects the battery with an alarm system as hereinafter described in more detail.

FIG. 1 illustrates an alarm system constructed in part in accordance with my copending application, referenced above. An alarm device 30 for emitting audible signals when electrically energized is mounted at a location which is inaccessible from the exterior of the vehicle as, for example, on the fire wall separating the passenger compartment from the engine compartment. The alarm device is preferably an electrically actuated bell or a horn similar to a conventional automobile horn. If desired, the automobile horn itself (not shown) may be employed as the alarm device. The alarm device includes a pair of terminals 32, one of which is a ground connection.

Electrical actuator switches 34 are placed adjacent each passenger door of the automobile. Each actuator switch includes a push button 36 which is spring-biased away from the body of the switch and which protrudes into the space occupied by a vehicle door when the door is in a closed position. Each actuator switch is of the normally closed type in that it is constructed so that it is closed when the push button 36 is biased away from the body of the switch, and is in an open position when the push button is displaced toward the body of the switch.

A normally closed actuator switch 38 is located at the forward end of the automobile adjacent hood 22 for cooperation with the hood. Switch 38 includes a push button 40 which operates identically to push button 36 of switch 34 to open and close the switch in response to opening and closing of the engine compartment hood.

Another normally closed actuator switch 44 is installed adjacent trunk lid 20 at the rear end of the automobile. Actuator switch 44 also includes a push button 46 to close and open the switch in response to opening or closing of the luggage compartment door.

Ignition switch 26 is shown schematically in FIG. 1 and includes a pair of terminals 48 and 50. Terminal 48 is connected to the ungrounded terminal of battery 24, and terminal 50 is connected to lead 52 which in turn is connected to one of the terminals of actuator switch 44. A lead 54 extends from terminal 50 to one of the terminals of actuator switch 38 beneath hood 22 of the vehicle. In one of its switching positions, preferably its off and/or its locking position, the ignition switch connects terminals 48 and 50 so that leads 52 and 54 form part of a circuit with the battery.

A pair of leads 56 and 58 extend from the second terminals of switches 44 and 38, respectively, toward the ungrounded terminal of alarm device 30. Leads 60 connect lead 52 with actuator switches 34 that are adjacent the rear passenger doors 16 and 18; leads 62 connect the other terminals of these actuator switches with lead 56 to define an open (when the vehicle doors are closed) electrical connection between terminal 50 of the ignition switch and the alarm device, which connection is closed to operate the alarm when one of doors 16 and 18 is opened.

The driver's door 12 includes a door lock 64 for locking that door with a key 66. An electric switch 68 is coupled with the lock so that terminals 70 and 72 of such switch are connected with each other when the door is locked and are interrupted when the lock is opened. A lead 74 connects terminal 70 with lead 52. A lead 76 connects terminal 72 of switch 68 with one of each pair of terminals of actuator switches 34 and adjacent front doors 12 and 14; leads 78 and 80 further connect the other terminals of these actuator switches with lead 56 and alarm device 30.

The alarm system is placed in-circuit with the battery by turning the ignition switch to the position in which terminals 48 and 50 of the switch are connected. All actuator switches except those adjacent front doors 12 and 14 are coupled into the alarm circuit. The switches adjacent the front doors are placed in-circuit with the battery by locking door lock 64 which closes switch 68. Thereafter, the opening of any of the several doors of the automobile energizes the alarm device 30 which causes an audible signal to be emitted.

Figure 2:
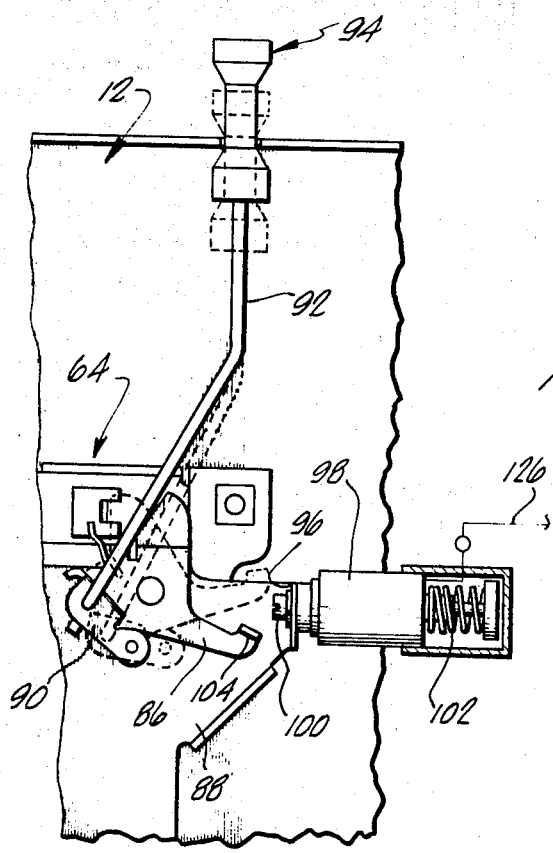
FIG. 2 is a fragmentary view of an automobile door, with parts broken away, a door locking mechanism, and of means for preventing the actuation of the locking mechanism while a key is in the vehicle ignition lock.

Referring to FIGS. 1 and 2, the door lock 64 of car door 14 is of a conventional construction. A keeper lever 86 is pivotally mounted in a frame structure 88 and has an off-set lug 90 to which a lower end of an operating rod 92 is pivotally attached. The rod extends upwardly through an aperture in the lower margin of a window opening of the door. The upper end of the rod includes a push button 94.

The frame structure 88 includes a bracket 96 which mounts a solenoid 98 so that a plunger 100 of the solenoid moves towards the keeper lever 86 when the solenoid is energized. A spring 102 biases the plunger away from the keeper lever. When the solenoid is energized the plunger moves to the left, as seen in FIG. 2, and engages a lug 104 projecting from the keeper lever, thereby preventing the pivotal movement of the keeper lever in response to depression of push button 94.

Figure 3:
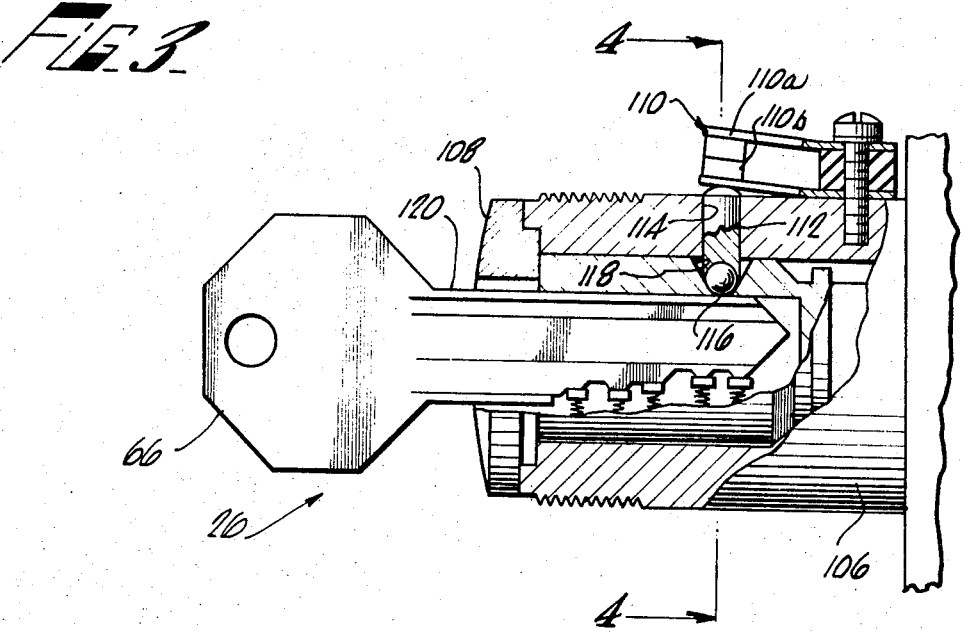
FIG. 3 is a cross-sectional view of an ignition switch useful in the system of the present invention.
Figure 4:
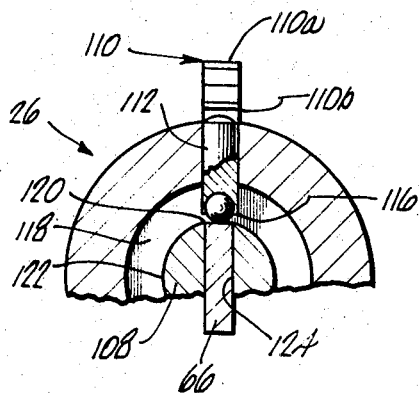
FIG. 4 is a fragmentary sectional view taken on line 4—4 of FIG. 3.
Figure 5:
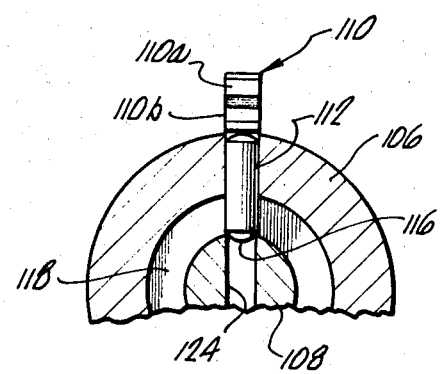
FIG. 5 is a view similar to FIG. 4 in which the key is removed from the ignition lock.

Referring to FIGS. 3 through 5, the ignition switch 26 includes a housing 106 and rotatably mounted therein a locking cylinder 108. Except as noted below, the housing and the locking cylinder are of a conventional construction and they are not further described herein.

Ignition switch housing 106 includes a pair of normally open electrical contacts 110 on its exterior. The contacts are insulated from the housing and are disposed in alignment with an axially movable elongated member 112 disposed in a radially oriented aperture 114 through the housing. An end of member 112 adjacent the locking cylinder preferably includes a rotatably mounted ball 116, or a roller (not shown), which is disposed in a groove 118 on the circumference of the lock cylinder. The groove extends transverse to the rotational axis of the cylinder and has a sufficient depth to permit the ball of the elongated member to engage a side 120 of the key 66 when key slot 124 is aligned with aperture 114. The key then lifts the member off a bottom 122 of the groove, projecting another end of the member exteriorly of housing 106 and thereby biasing contact 110b into engagement with the contact 110a.

A lead 126 (shown in FIG. 1) connects contact 110a with one terminal of solenoid 98 while the other terminal of the solenoid is grounded. The solenoid is energized, so that plunger 100 projects outwardly from the solenoid, when member 112 of the ignition switch closes the contacts 110 in response to key 66 being positioned in alignment with aperture 114. While the solenoid is energized, the potential (or actual) engagement between the plunger and keeper lever 86 prevents both the locking of the door 12 and the setting of the automobile's theft alarm system.

In operation, while driving the vehicle, the locking cylinder must be disposed in a position in which key slot 124 and member 112 are not aligned. Ball 116 therefore rests on bottom 122 of groove 118 and contacts 110 are open with the result that solenoid 98 is not energized and plunger 100 is retracted from keeper lever 86. The push button 94 on operating rod 92 then can be depressed to lock the door while the automobile is operated. By locking the door during operation of the vehicle, however, the alarm system is not set since contacts 48 and 50 on ignition switch 26 are disconnected.

When the vehicle comes to a stop and the operator wishes to park, depart from, and lock the vehicle, he turns the lock cylinder 108 into its "off" or "locking" position in which key slot 124 is in alignment with member 112. The ignition system of the automobile is thereby turned off. Normally, the operator then removes the key from the slot, leaves the vehicle, and locks the vehicle from the exterior thereof. Since contacts 48 and 50 of the ignition switch are then interconnected, the locking of the door energizes the alarm system by closure of switch 68.

Many automobiles are constructed so that a door can be locked by depressing push button 94 while the door is in an open position, and by closing the door while a handle of the door lock (not shown) is manually depressed. If the operator of such a vehicle inadvertently leaves key 66 in the ignition switch after the ignition system has been turned off, member 112 projects to the exterior of housing 106 and closes contacts 110. This energizes solenoid 98 and prevents the locking of door lock 84. Thus, when the operator attempts to lock the door he is reminded that the key has not been removed from the ignition switch.

Although this is a desirable safety feature on all automobiles having an alarm system activated by the door lock, it is particularly desirable when the door lock can be set without the ignition key. It prevents the owner from the vehicle from locking himself out while also providing the advantages of an alarm system that is set by locking a door of the automobile.

Some ignition switches have two operating positions in which the ignition of the automobile is turned off. One of these positions might connect the battery of the automobile with various electrical accessories in the vehicle, such as a radio (not shown) or a heater (not shown). The other one of the positions is the locking position of the ignition switch in which the key can be removed from the switch.

Figure 6:
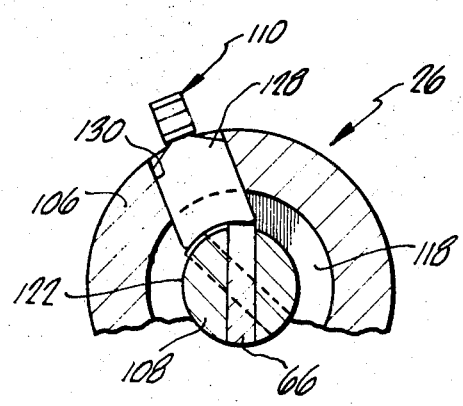
FIG. 6 is a view similar to FIG. 5 showing another embodiment of the ignition lock shown in FIGS. 3 and 4.

Referring to FIG. 6, ignition switch 26 is constructed so that contacts 110 are closed whenever key 66 is in key slot 124 and the lock cylinder is in one of the two operating positions referred to in the preceding paragraph. A flat, relatively wide plate 128 is slidable in an elongated slot 130 in housing 106. One end of the plate has an arcuate shape of a configuration complementary to that of bottom 122 of groove 118 and a length sufficient to cover the key slot in both operating positions of the switch in which the ignition system is deactivated. Contacts 110 are preferably disposed in the center of another end of the plate. The plate has a configuration such that contacts 110 are open when the plate rests on bottom 122 of the groove and are closed when side 120 of the key lifts the plate off the groove bottom. In all other respects the construction of the ignition switch, as well as the electrical connections of contacts 110, are identical to that shown in and described in conjunction with FIGS. 3 through 5.

Figure 7:
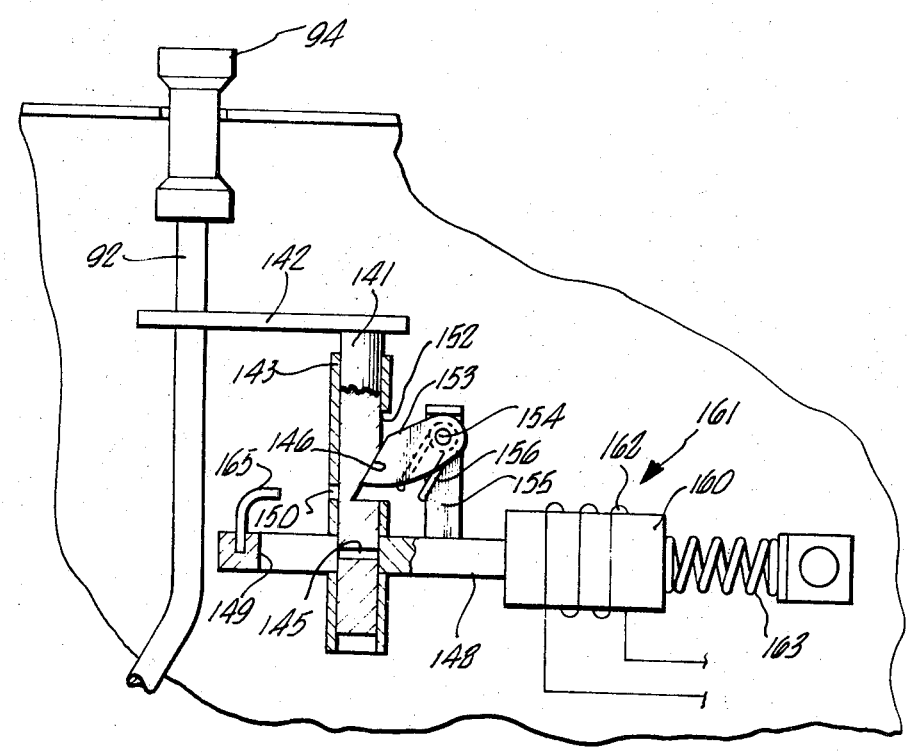
FIG. 7 is a fragmentary elevation view of an automobile door latch mechanism equipped with a disabling control different from that shown in FIG. 2.

FIG. 7 illustrates a latch disabling device 140 which may be used with a door latch mechanism, including an operating plunger rod 92 connected to a keeper lever like that shown in FIG. 2 and a push button 94, but which has several advantages over the structure shown in FIG. 2. A bar 141 is mounted to plunger rod 92 by a strut 142 for reciprocation with the plunger rod within a sleeve 143 mounted to door structure 144. Adjacent its lower end the bar is fitted with a transverse hole 145 and, above the hole, wtih a ratchet stop recess 146 having a lower surface 147 disposed normal to the length of the bar. A reciprocal arm 148 extends transversely through the sleeve adjacent the lower end of bar 141. The arm has an elongate slot 149 through it within which the lower end of the bar is positioned. When plunger rod 92 is in its downward position, hole 145 is positioned below a hole 150 through the sleeve a distance equal to the reciprocation permitted to the plunger rod; in this same position of the plunger rod, recess 146 is positioned adjacent an opening 152 through the sleeve above arm 148. Hole 150 and opening 152 are located on opposite sides of the sleeve and are aligned with the length of arm 148.

A ratchet pawl 153 is pivoted at 154 to a lug 155 mounted to arm 148 adjacent opening 152. A torsion spring 156 is engaged between the pawl and the lug to bias the pawl clockwise about pivot 154, but clockwise movement of the pawl is limited by a flange 157 defined by the lug above the pawl pivot point.

The end of arm 148 adjacent lug 155 is connected to a core 160 of a solenoid 161 having a coil 162. The core and the arm are biased by a spring 163 into the position shown in FIG. 7, the core and the arm being reciprocable against the spring upon energization of the coil to disengage pawl 153 from ratchet recess 146.

The end of arm 148 opposite from the solenoid carries a finger 165 which is adapted to enter sleeve hole 150 upon energization of the solenoid. When the solenoid is energized and when plunger rod 92 is fully raised to unlock the door latch mechanism, finger 165 also enters hole 145 in rod 141 to prevent depression of the push button so long as the solenoid is energized. When the solenoid is not energized, the finger is spaced from rod 141 a distance at least equal to the distance which arm 148 must move to disengage the pawl from the ratchet recess, but such distance is less than the amount of travel imparted to the arm upon energization of the solenoid.

The structure shown in FIG. 2 is installed in the front doors of an automobile, each such door being equipped with a key-operated switch 68 connected in the manner described above. The solenoid is connected to switch 68 and to ignition switch 26 in such a manner that the solenoid is energized when a key is present in either of these switches.

Assume that the structure of device 140 is in the relation shown in FIG. 2; such a relation exist when no key is present in the ignition switch and the door has been locked by depression of push button 94, and is typical of the case where the vehicle has been parked and locked. The operator of the automobile may unlock the door by inserting the ignition key in the lock associated with switch 68, thereby energizing the solenoid. Upon energization of the solenoid, arm 148 moves to the right until finger 165 abuts rod 141 through hole 150, such movement of the arm also freeing the pawl from recess 146 so that the plunger rod may be raised during continued unlocking of the door by the key. When the plunger rod has been fully raised by reason of unlocking of the door, holes 145 and 150 are registered. Thus, the energization of the solenoid is then effective to drive the arm further to the right and to cause finger 165 to engage hole 145. The door is then fully unlocked.

If an operator of the automobile should attempt to lock a door fitted with the mechanism shown without the use of a key, device 140 prevents locking of the door so long as a key is present in the ignition switch. When the door is unlocked and the solenoid is energized by reason of a key being present in the ignition switch, arm 148 is moved fully to the right (see FIG. 7) so that finger 165 is engaged in hole 145 such that push button 94 cannot be depressed. Once the solenoid is deenergized, the arm moves to the left and the door can then be locked by use of the push button, depression of the button moving the rod downwardly in sleeve 143 until the pawl moves into recesses 146. Thereafter, the door can be opened only by the use of a proper key.

Frequently automobiles are left in a locked state with a key in the ignition, and are stolen by a thief breaking a front door window to unlock the car by raising push button 94. Automobiles can be stolen in a very short time by such procedures. Device 140 prevents thefts by such procedures since it prevents the door from being locked with a key in the ignition switch. Also, since a properly locked automobile fitted with device 140 cannot be unlocked without the use of a proper key, a would-be thief cannot enter the vehicle without breaking a window sufficiently to enable him to enter through the broken window. Considering the time which must be spent to break a safety glass window to such a degree, it is apparent that device 140 provides a substantial impediment to the theft of properly locked automobiles.

Modifications may, of course, be made within the realm and scope of this invention. For example, the door lock may be constructed so that solenoid 98 functions only to incapacitate push button 94 and operating rod 92 while permitting the locking of the door with key 66; this is practical since locking of the door requires the operator to have the ignition key in his possession. Similarly, the constructional details of the ignition switch 26 may be altered as, for example, by replacing ball 116 secured to member 112 with a suitaby mounted roller (not shown).

I claim:

1. In an automobile having a body, a door, a key operated door lock, mechanical means for locking the door independently of the key operated door lock, an electrically actuated alarm system set by locking the door to discourage unauthorized persons from entering the automobile when the doors have been locked, and a key operated ignition switch in an ignition system of the automobile, the improvement comprising:

electrically actuated means coupled to the ignition switch and responsive to the presence of a key in the ignition switch for preventing door locking operation of the mechanical means when the key is in the ignition switch and the ignition switch is in other than an automobile operating position.

2. Apparatus according to claim 1 wherein the ignition switch includes a plurality of positions in at least one of which the ignition system is deactivated and the alarm system is operatively coupled with an electric power source, and wherein the electrically actuated means prevent the locking of the door and the setting of the alarm system when the ignition switch is in said one position so long as the key is in the ignition switch.

3. Apparatus according to claim 2 wherein the electrically actuated means include a solenoid which mechanically disables the door lock and the mechanical means when the ignition switch is in said one position and the key is in the ignition switch.

4. Apparatus according to claim 1 wherein the ignition switch includes a lock cylinder disposed in a housing and into which an ignition key is insertable, and including a pair of normally open electric contacts in circuit connection with the electrically actuated means on the housing, and movable means in the housing cooperating with the lock cylinder for closing the contacts in response to the insertion of the key in the ignition switch.

5. Apparatus according to claim 4 wherein the movable means includes a movable member movably mounted in the housing, means biasing the member into engagement with the periphery of the lock cylinder, the lock cylinder, an ignition key, and the movable member being cooperatively arranged so that the key engages and displaces the movable member to close said contacts when the lock cylinder is disposed relative to the housing to define an ignition switch position which is other than an automobile operating position of the switch.

6. Apparatus according to claim 1 wherein the alarm system includes a plurality of actuator switches located one adjacent to and cooperating with each door of the automobile, a battery in the automobile to which the actuator switches are connected, the actuator switches each being in an open position when the adjacent door is closed and in a closed position when the adjacent door is open, and alarm means connected in circuit relation between the actuator switches and the battery for emitting alarm signals when connected in circuit with the battery in response to operation of at least one of the actuator switches, the alarm means being attached to the automobile at a location which is inaccessible from the exterior of the automobile, and the ignition switch being connected with the actuator switches in circuit relation for selectively disconnecting the actuator switches from the battery.

7. An alarm system according to claim 6, wherein the door lock and mechanical means are associated with the door adjacent an operator's station of the automobile and cooperate to set the alarm upon operation of the door lock by a key for the ignition switch.

8. An alarm system according to claim 6 including an engine compartment door for the automobile, an actuator switch adjacent the engine compartment door and connected in circuit relation with the battery, the alarm means and the ignition switch for operation of the hood actuator switch to close an electric circuit between the battery and the alarm means in response to opening of the engine compartment door.

9. An alarm system according to claim 8 including a luggage compartment door for the automobile, an actuator switch adjacent the luggage compartment door and connected with the battery, the alarm means, and the ignition switch for operation of the lid actuator switch to close an electric circuit between the alarm means and the battery in response to opening of the luggage compartment door.

10. An alarm system for preventing theft or burglary of an automobile having an electric storage battery and a plurality of doors providing access to the interior of the automobile, the system comprising:

(a) a plurality of actuator switches located one adjacent to and cooperating with each door and connected with the battery, the actuator switches each being in an open position when the adjacent door is closed and in a closed position when the adjacent door is open;

(b) alarm means connected in circuit relation with the battery via the actuator switches for emitting alarm signals upon closure of any one of the actuator switches, the alarm means being attached to the automobile at a location inaccessible from the exterior of the automobile;

(c) key actuated first control means operable from the exterior of the automobile for electrically coupling the actuator switches with the alarm means and the battery;

(d) second control means cooperating with the first control means for coupling actuator switches with the battery independently of the first control means;

(e) a key operated ignition switch adapted to be set in a plurality of operating positions in at least one of which an ignition system for an engine of the automobile is de-energized; and (f) means associated with the ignition switch and responsive to the presence of a key therein when the ignition switch is in said one position for disabling operation of the second control means.

11. Apparatus according to claim 10 wherein the means associated with the ignition switch is responsive to the presence of a key in the ignition switch in the one position of the ignition switch to disable operation of both the first and second control means.

12. Apparatus according to claim 11 wherein the control means are mounted on at least one door of the automobile and mechanically actuate a door lock, and wherein the means associated with the ignition switch includes solenoid means having a reciprocable plunger engaging a member of the control means when the ignition key is in the ignition switch and the lock is in said one position.

13. Apparatus according to claim 12 wherein the ignition switch includes a lock cylinder rotatably disposed in a housing, a movable member in the housing, the outer periphery of the lock cylinder defining a groove extending at least partially circumferentially thereof and in which an end of the movable member normally is disposed, said end being engaged by the ignition key when the key is inserted in the lock cylinder and the ignition switch is in said one position for displacement of the movable member out of engagement with the groove, and means responsive to displacement of the movable member for coupling the solenoid means in circuit with the battery.

14. Apparatus according to claim 13 wherein the movable member engages the ignition key in either of two adjacent operating positions of the lock cylinder in the housing.

15. In an automobile having a body, a door, a lock mechanism for the door operable to lock the door either by use of a key or independently of the use of a key, and an ignition system including a battery and a key operated ignition switch, the improvement comprising
   (a) a switch coupled to the battery and associated with the lock mechanism responsive to the presence of a key in the lock mechanism to generate a first electrical signal,
   (b) means associated with the ignition switch for generating a second electrical signal in response to the presence of a key in the ignition switch, and
   (c) lock mechanism disabling means coupled to the lock mechanism operable in the absence of the application of said first signal thereto to disable door unlocking operation of the lock mechanism, operable in response to the first signal to enable door unlocking operation of the lock mechanism, and operable in response to said second signal to disable door locking operation of the lock mechanism.

References Cited
UNITED STATES PATENTS

| | | | |
|---|---|---|---|
| 1,743,730 | 1/1930 | Rugg et al. | 340—64 |
| 2,385,285 | 9/1945 | Kolia | 340—64 |
| 2,650,354 | 8/1953 | Joiner | 340—64 |

ALVIN H. WARING, Primary Examiner

H. S. COHEN, Assistant Examiner

U.S. Cl. X.R.

180—114; 200—61.66